United States Patent
Taya

(10) Patent No.: US 9,312,654 B2
(45) Date of Patent: Apr. 12, 2016

(54) OPTICAL AMPLIFICATION COMPONENT AND FIBER LASER DEVICE

(71) Applicant: FUJIKURA LTD., Tokyo (JP)

(72) Inventor: Hiroyuki Taya, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/164,534

(22) Filed: Jan. 27, 2014

(65) Prior Publication Data

US 2014/0211300 A1 Jul. 31, 2014

(30) Foreign Application Priority Data

Jan. 30, 2013 (JP) .................... 2013-015135

(51) Int. Cl.
| | |
|---|---|
| H01S 3/067 | (2006.01) |
| G02B 6/43 | (2006.01) |
| H01S 3/04 | (2006.01) |
| H01S 3/0941 | (2006.01) |
| H01S 3/042 | (2006.01) |
| G02B 6/42 | (2006.01) |

(52) U.S. Cl.
CPC ........... *H01S 3/0405* (2013.01); *H01S 3/06704* (2013.01); *G02B 6/4296* (2013.01); *G02B 6/43* (2013.01); *H01S 3/042* (2013.01); *H01S 3/06754* (2013.01); *H01S 3/09415* (2013.01)

(58) Field of Classification Search
CPC ............ H01S 3/06704; H01S 3/06754; H01S 3/06758; G02B 6/43
See application file for complete search history.

(56) References Cited

U.S. PATENT DOCUMENTS

| | | | | |
|---|---|---|---|---|
| 5,923,694 | A | * | 7/1999 | Culver .............................. 372/69 |
| 5,933,437 | A | * | 8/1999 | Delavaux ........................... 372/6 |
| 6,167,066 | A | * | 12/2000 | Gaeta et al. ....................... 372/6 |
| 6,167,181 | A | * | 12/2000 | Fukaishi ........................ 385/123 |
| 6,459,068 | B1 | * | 10/2002 | Yamaura et al. ............ 219/121.6 |
| 2001/0021300 | A1 | * | 9/2001 | Yoshida .......................... 385/134 |
| 2003/0048815 | A1 | * | 3/2003 | Cook ................................ 372/3 |
| 2009/0060444 | A1 | * | 3/2009 | Muendel ........................ 385/137 |
| 2009/0147351 | A1 | * | 6/2009 | Oshita et al. ................ 359/341.1 |
| 2014/0362876 | A1 | * | 12/2014 | Schwarzenbach et al. ........ 372/6 |

FOREIGN PATENT DOCUMENTS

JP 2010-177553 A 8/2010

* cited by examiner

*Primary Examiner* — Eric Bolda
(74) *Attorney, Agent, or Firm* — Westerman, Hattori, Daniels & Adrian, LLP

(57) ABSTRACT

An optical amplification component 1 includes a heat dissipation plate 10 and an amplification optical fiber 20 arranged on the heat dissipation plate 10. The amplification optical fiber 20 includes a first section SC1 extending from a reference position RP between a first end E1 and a second end E2 of the amplification optical fiber 20 up to a position at which a fiber portion 20A extending from the reference position RP toward the end E1 and a fiber portion 20B extending from the reference position RP toward the end E2 are aligned in one direction, and a second section SC2 where the fiber portions 20A and 20B aligned in one direction are wound in a spiral outside the first section SC1. The circumferences of one and the other end parts of the amplification optical fiber 20 are separated from side surfaces of the fiber portions wound in a spiral.

21 Claims, 11 Drawing Sheets

OPTICAL AMPLIFICATION COMPONENT AND FIBER LASER DEVICE

BACKGROUND OF THE INVENTION

The present invention relates to an optical amplification component and a fiber laser device suitable for dissipating heat from an amplification optical fiber.

A part of pumping light that propagates through an amplification optical fiber is transformed into heat due to transmission loss in the amplification optical fiber. Further, heat is also generated when an active element which is added to a core of the amplification optical fiber is pumped by the pumping light, and light is thereby emitted from the active element. The amplification optical fiber tends to be short-lived due to such heat. This tendency has become stronger along with a recent request for realizing a high-output fiber laser device.

Japanese Unexamined Patent Application Publication No. 2010-177553 discloses a technique for fixing an amplification optical fiber to a heat dissipation plate. It would appear that heat generation in the amplification optical fiber can be reduced by using this technique.

SUMMARY OF THE INVENTION

However, in Japanese Unexamined Patent Application Publication No. 2010-177553, deterioration caused by heat generation is likely to disadvantageously occur in a part of the amplification optical fiber, the part not being arranged on the heat dissipation plate.

Therefore, the present invention is directed to provide an optical amplification component and a fiber laser device capable of improving the life of an amplification optical fiber.

As a result of intensive studies to solve the above problems, the present inventors have found that, when pumping light enters an amplification optical fiber from both ends thereof, heat generation is distributed such that the amount of heat generation is largest at the ends of the amplification optical fiber, and decreases toward the center thereof.

Therefore, how to arrange the entire amplification optical fiber having such a heat generation amount distribution on a heat dissipation plate has become a new problem, and further intensive studies have been made on the new problem to achieve the present invention.

According to the present invention, there is provided an optical amplification component including: a heat dissipation plate; and an amplification optical fiber arranged on the heat dissipation plate, the amplification optical fiber including a first section extending from a reference position between a first end and a second end of the amplification optical fiber up to a position at which a first fiber portion extending from the reference position toward the first end and a second fiber portion extending from the reference position toward the second end are aligned in one direction, and a second section where the first fiber portion and the second fiber portion are wound in a spiral outside the first section along each other, wherein the circumference of a first end part of the amplification optical fiber and the circumference of a second end part of the amplification optical fiber are separated from side surfaces of the first fiber portion and the second fiber portion wound in a spiral.

In such a configuration, the both ends of the amplification optical fiber at which the amount of heat generation is largest are located away from the fiber portions located on the inner side of the both ends of the amplification optical fiber. Therefore, deterioration of the fiber portions located on the inner side of the both ends of the amplification optical fiber, the deterioration being caused by heat generated at the both ends of the amplification optical fiber, can be significantly reduced. In this manner, the optical amplification component capable of improving the life of the amplification optical fiber is achieved.

Further, it is preferable that the amplification optical fiber includes the first section, the second section, and a third section extending from a position at which each of the first fiber portion and the second fiber portion is separated from the second section up to each of the first end and the second end of the amplification optical fiber, and each of the first fiber portion and the second fiber portion is located outside the section with being separated from the second section in the entire third section.

In such a configuration, the both ends of the amplification optical fiber at which the amount of heat generation is largest are located further away from the fiber portions in the second section and the first section compared to the case where only the first end part and the second end part of the amplification optical fiber are separated from the optical fibers wound in a spiral. Therefore, deterioration of the fiber portions located on the inner side of the both ends of the amplification optical fiber, the deterioration being caused by heat generated at the both ends of the amplification optical fiber, can be further significantly reduced.

Further, it is preferable that each of the first fiber portion and the second fiber portion extends in a direction away from the second section in the third section.

In such a configuration, the both ends of the amplification optical fiber at which the amount of heat generation is largest are located away from the fiber portions in the second section and the first section. Therefore, deterioration of the fiber portions located on the inner side of the both ends of the amplification optical fiber, the deterioration being caused by heat generated at the both ends of the amplification optical fiber, can be significantly reduced.

Further, it is preferable that an extending direction of the first fiber portion in the third section and an extending direction of the second fiber portion in the third section are opposite to each other.

In such a configuration, the distance between the both ends of the amplification optical fiber at which the amount of heat generation is largest is longer than that in an optical amplification component in which the extending direction of the first fiber portion and the extending direction of the second fiber portion are the same as each other. Therefore, deterioration of each of the ends of the amplification optical fiber and the vicinity thereof, the deterioration being caused by heat generated at the both ends of the amplification optical fiber, can be further significantly reduced.

Further, it is preferable that the distance between the first fiber portion and the second fiber portion increases toward the ends thereof in the second section, or the second section and the third section.

In such a configuration, the distance between the both ends of the amplification optical fiber at which the amount of heat generation is largest is longer than that in an optical amplification component in which the distance between the first fiber portion and the second fiber portion does not increase toward the ends thereof in the second section or the second section and the third section. Therefore, deterioration of each of the ends of the amplification optical fiber and the vicinity thereof, the deterioration being caused by heat generated at the both ends of the amplification optical fiber, can be further significantly reduced.

Further, it is preferable that the first end part and the second end part of the amplification optical fiber are opposed to each other across the first section.

In such a configuration, the both ends of the amplification optical fiber at which the amount of heat generation is largest can be symmetrically arranged with respect to the first section, thereby further increasing the distance between the both ends. Therefore, deterioration of the both ends of the amplification optical fiber and the vicinities thereof, the deterioration being caused by heat generated at the both ends of the amplification optical fiber, can be further significantly reduced.

Further, it is preferable that one end face and the other end face of the amplification optical fiber face in opposite directions.

In such a configuration, local heat generation in the heat dissipation plate can be reduced compared to the case where the end face of the first fiber portion and the end face of the second fiber portion face in the same direction.

The heat dissipation plate preferably has a structure in which the amount of heat dissipation in a heat dissipation area in which each of the first end part and the second end part of the amplification optical fiber is arranged is larger than the amount of heat dissipation in a heat dissipation area in which the first section is arranged.

In such a configuration, it is possible to intensively cool the both ends of the amplification optical fiber at which the amount of heat generation is largest. Therefore, it is possible to reduce deterioration of the amplification optical fiber while more downsizing the structure of the heat dissipation plate than the structure of a heat dissipation plate in which the thermal resistance of the heat dissipation area in which the both end parts of the amplification optical fiber are arranged and the thermal resistance of the heat dissipation area in which the other part of the amplification optical fiber is arranged are same as each other.

According to the present invention, there is provided a fiber laser device including: the optical amplification component described above; a seed light source; a first pumping light source; a second pumping light source; an input side optical coupler inputting seed light emitted from the seed light source to a core of the amplification optical fiber at the first end of the amplification optical fiber and inputting pumping light emitted from the first pumping light source to a cladding of the amplification optical fiber at the first end of the amplification optical fiber; and an output side optical coupler inputting pumping light emitted from the second pumping light source to the second end of the amplification optical fiber and outputting seed light propagating through the core of the amplification optical fiber to the outside.

According to the present invention, there is provided a fiber laser device including: the optical amplification component described above; a first pumping light source; a second pumping light source; an input side optical coupler inputting pumping light emitted from the first pumping light source to a cladding of the amplification optical fiber at the first end of the amplification optical fiber; an output side optical coupler inputting pumping light emitted from the second pumping light source to the second end of the amplification optical fiber; a first mirror reflecting at least a part of light emitted from an active element added to a core of the amplification optical fiber; and a second mirror reflecting light reflected by the first mirror with a lower reflectivity than the first mirror.

Also when the above optical amplification component is used as one of the components of such a fiber laser device, deterioration of the fiber portions located on the inner side of the both ends of the amplification optical fiber, the deterioration being caused by heat generated at the both ends of the amplification optical fiber, can be significantly reduced. In this manner, the fiber laser device capable of improving the life of the amplification optical fiber is achieved.

As described above, the present invention can provide the optical amplification component and the fiber laser device capable of improving the life of the amplification optical fiber.

DETAILED DESCRIPTION OF THE INVENTION

Hereinbelow, embodiments of the present invention will be described in detail with reference to the accompanying drawings.

(1) First Embodiment

Figure 1:
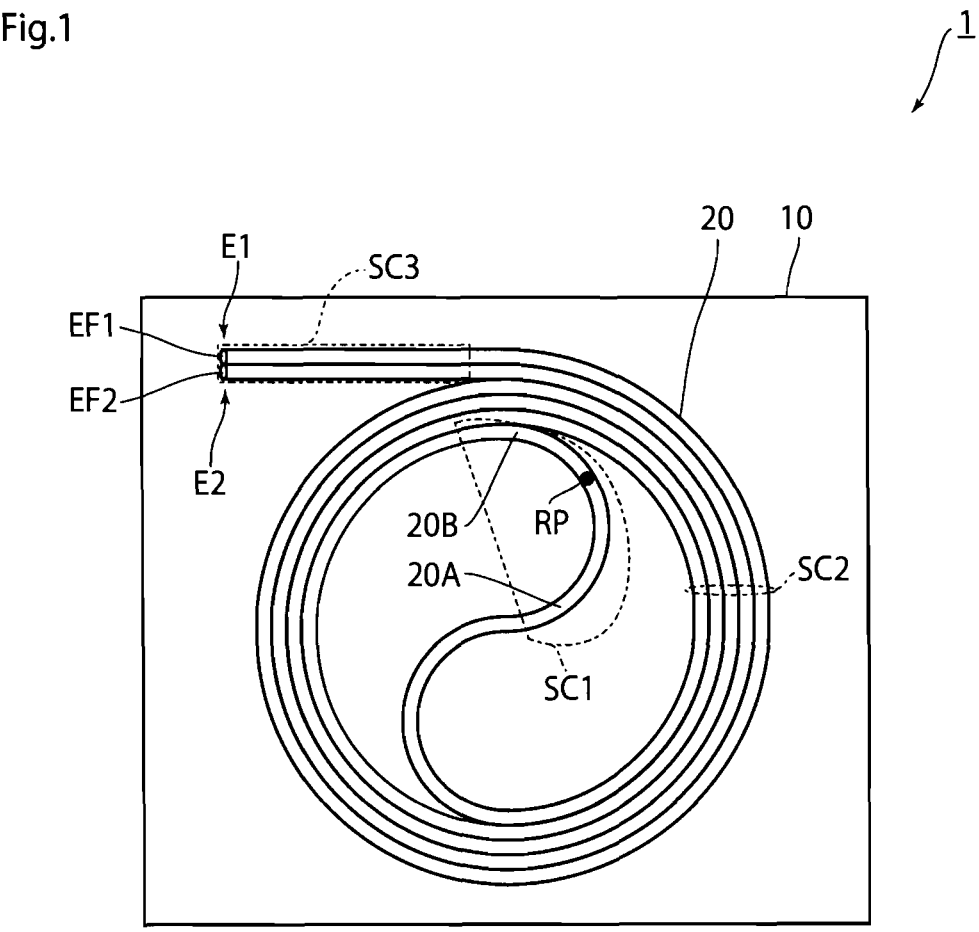
FIG. 1 is a diagram illustrating an optical amplification component in a first embodiment.

FIG. 1 is a diagram illustrating an optical amplification component 1 in the first embodiment. As illustrated in FIG. 1, the optical amplification component 1 of the present embodiment includes, as main components, a heat dissipation plate 10 and an amplification optical fiber 20 which is fixed to a heat dissipation surface of the heat dissipation plate 10.

The heat dissipation plate 10 is a plate member for reducing temperature by dissipating heat. The material of the heat dissipation plate 10 is metal such as silver, copper, gold, and aluminum, or an alloy thereof. The heat dissipation plate 10 has, for example, a rectangular parallelepiped shape.

Figure 2:
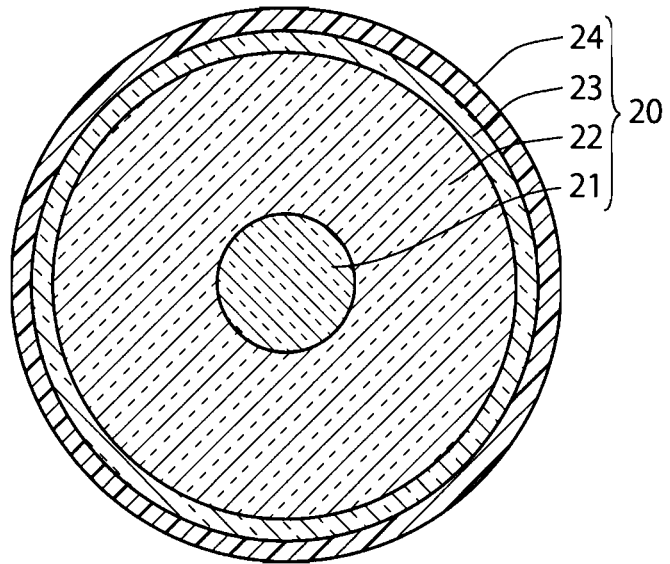
FIG. 2 is a diagram illustrating the cross section of an amplification optical fiber, the cross section being perpendicular to the length direction thereof.

FIG. 2 is a diagram illustrating the cross section of the amplification optical fiber 20, the cross section being perpendicular to the length direction thereof. As illustrated in FIG. 2, the amplification optical fiber 20 includes a core 21 to which one or more kinds of active elements are added, a first cladding 22 which covers the outer peripheral surface of the core 21, a second cladding 23 which covers the outer peripheral surface of the first cladding 22, and a cover layer 24 which surrounds the second cladding 23.

The refractive index of the core 21 is higher than the refractive index of the first cladding 22. The refractive index of the first cladding 22 is higher than the refractive index of the second cladding 23. The refractive index of the second cladding 23 is lower than the refractive index of the cover layer 24.

Examples of the active element include a rare earth element such as erbium (Er), ytterbium (Yb) and neodymium (Nd) and an active element other than a rare earth element such as bismuth (Bi).

As illustrated in FIG. 1, the amplification optical fiber 20 in the present embodiment includes a first section SC1, a second section SC2, and a third section SC3.

The first section SC1 extends from a reference position RP between a first end E1 and a second end E2 of the amplification optical fiber 20 up to a position at which a fiber portion 20A which extends from the reference position RP toward the first end E1 and a fiber portion 20B which extends from the reference position RP toward the second end E2 are aligned in one direction.

That is, the first section SC1 extends from the reference position RP up to the position at which the fiber portions 20A and 20B which are bent at the reference position RP as a base point are aligned in one direction. In the present embodiment, the fiber portions 20A and 20B which are bent at the reference position RP as a base point are aligned in one direction in such a manner that the cross section of the fiber portion 20A and the cross section of the fiber portion 20B, the cross sections being perpendicular to the optical axis of the optical fiber, are parallel to each other.

The reference position RP is reference for assigning the fiber portion 20A and the fiber portion 20B. The reference position RP is, for example, defined as the center of the amplification optical fiber 20 in the length direction thereof. The reference position RP may be defined as a position shifted from the center of the amplification optical fiber 20 in the length direction thereof toward the first end E1 or the second end E2. Although the shape formed by the bent fiber portions 20A and 20B in the first section SC1 is a semicircular shape in the example illustrated in FIG. 1, various shapes can be applied thereto. Further, although the fiber portions 20A and 20B are arranged so as not to intersect each other in the first section SC1 in FIG. 1, the fiber portions 20A and 20B may intersect each other at some position.

The second section SC2 is a section where the fiber portions 20A and 20B aligned in one direction are wound in a spiral outside the first section SC1.

In the present embodiment, the fiber portions 20A and 20B are in contact with each other in the second section SC2. However, the fiber portions 20A and 20B may be separated from each other in a part of the second section SC2 or the entire second section SC2. In the present embodiment, the inner side of the fiber portion 20A and the outer side of the fiber portion 20B are in contact with each other, and the outer side of the fiber portion 20A and the inner side of the fiber portion 20B are in contact with each other in the second section SC2. However, the inner side of the fiber portion 20A and the outer side of the fiber portion 20B may be separated from each other, and the outer side of the fiber portion 20A and the inner side of the fiber portion 20B may be separated from each other in a part of the second section SC2 or the entire second section SC2.

In the present embodiment, the fiber portions 20A or 20B are wound in a spiral while keeping a constant distance therebetween in the second section SC2. However, the fiber portions 20A or 20B may not keep a constant distance therebetween in a part of the second section SC2 or the entire second section SC2. Further, although the fiber portions 20A and 20B are wound in a circular spiral in the second section SC2, the fiber portions 20A and 20B can be wound in various forms.

The third section SC3 extends from a position at which the fiber portions 20A and 20B are released from the wound state up to the first end E1 and the second end E2 of the amplification optical fiber 20.

That is, the third section SC3 extends from the position at which the fiber portions 20A and 20B are separated from the wound part thereof up to the ends of the amplification optical fiber 20. The fiber portions 20A and 20B within the entire third section SC3 are located outside the second section SC2 with being separated from the second section SC2.

In the present embodiment, the fiber portions 20A and 20B are parallel to each other in the third section SC3. A first end face EF1 of the fiber portion 20A and a second end face EF2 of the fiber portion 20B are parallel to each other.

Pumping light enters the first cladding 22 at the first end face EF1 and the second end face EF2 of the amplification optical fiber 20.

The pumping light that has entered the first cladding 22 propagates through the first cladding 22 and the core 21 of the amplification optical fiber 20. The active element which is added to the core 21 is pumped by the pumping light, and light having a specific wavelength is thereby emitted from the active element.

As describe above, when light is emitted from the active element which is added to the core 21 of the amplification optical fiber 20, heat is generated. Further, a part of the pumping light that propagates through the amplification optical fiber 20 is transformed into heat due to transmission loss in the amplification optical fiber 20.

Figure 3:
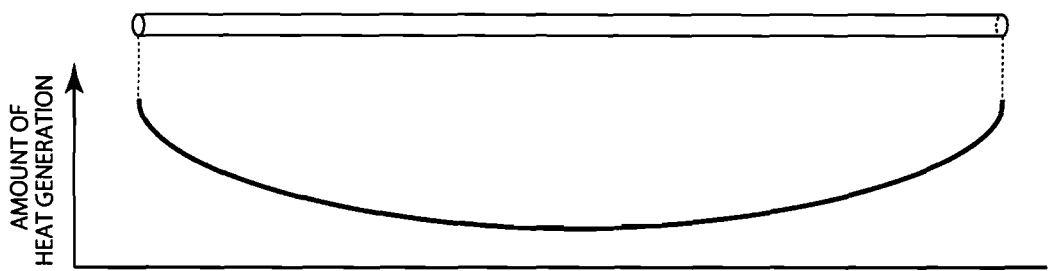
FIG. 3 is a diagram illustrating the distribution of the amount of heat generation of the amplification optical fiber when pumping light enters the amplification optical fiber from both ends thereof.

FIG. 3 is a diagram illustrating the distribution of the amount of heat generation of the amplification optical fiber 20 when pumping light enters the amplification optical fiber 20 from the both ends thereof. As illustrated in FIG. 3, when pumping light enters the amplification optical fiber 20 from the both ends thereof, heat generation is distributed such that the amount of heat generation is largest at the ends of the amplification optical fiber 20, and decreases toward the center thereof.

Generally, heat generation at each position on the amplification optical fiber 20 is proportional to the amount of energy of pumping light that passes through the position. Therefore, such a heat generation amount distribution is formed.

That is, a part of pumping light is transformed into heat at each position of the amplification optical fiber 20 due to transmission loss in the amplification optical fiber 20, thereby generating heat in the amplification optical fiber 20. Therefore, the amount of heat generation is approximately proportional to the product of the transmission loss and the amount of energy of pumping light at each position. Since the transmission loss of the amplification optical fiber 20 is substantially constant at any positions thereon, the amount of heat generation is larger at the position at which the amount of energy of pumping light is larger in the amplification optical fiber 20. Since the pumping light enters the both ends of the amplification optical fiber 20 in the present embodiment, the amount of energy of pumping light is largest at the both ends of the amplification optical fiber 20. Then, the pumping light propagates through the amplification optical fiber 20 toward the center thereof. At this point, since a part of the energy of the pumping light is transformed into heat due to the transmission loss of the amplification optical fiber 20, the amount of energy is gradually reduced. The transmission loss of the amplification optical fiber 20 is considerably larger than that of a general communication optical fiber. Therefore, reduction of the amount of energy caused by the propagation of the pumping light is also considerably large. As a result, the difference between the amount of heat generation at the center of the amplification optical fiber 20 and the amount of heat generation at the both ends thereof becomes large.

In the optical amplification component 1 in the present embodiment, each of the fiber portion 20A and the fiber portion 20B is arranged on the heat dissipation surface of the heat dissipation plate 10 so as to extend in a direction away from the second section SC2 in the third section SC3 of the amplification optical fiber 20.

Therefore, the both ends of the amplification optical fiber 20 at which the amount of heat generation is largest are located away from the fiber portions 20A and 20B within the second section SC2 and the first section SC1 which are located on the inner side of the both ends of the amplification optical fiber 20.

Therefore, deterioration of the fiber portions located on the inner side of the both ends of the amplification optical fiber 20, the deterioration being caused by heat generated at the both ends of the amplification optical fiber 20, can be significantly reduced. In this manner, the optical amplification component 1 capable of improving the life of the amplification optical fiber 20 is provided.

(2) Second Embodiment

Next, the second embodiment will be described in detail with reference to the accompanying drawing. The same or equivalent components as/to those of the first embodiment are denoted by the same reference signs, and an overlapping description will be omitted excepting when a description for such components is particularly necessary.

Figure 4:
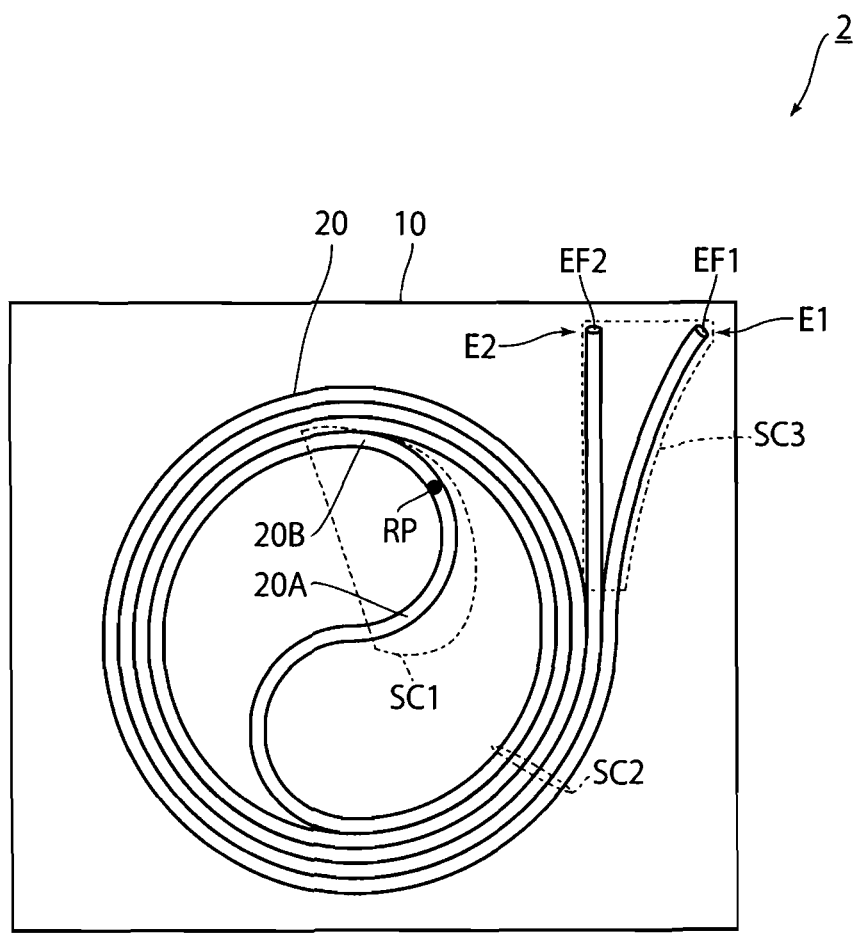
FIG. 4 is a diagram illustrating an optical amplification component in a second embodiment.

FIG. 4 is a diagram illustrating an optical amplification component 2 in the second embodiment. As illustrated in FIG. 4, in the optical amplification component 2 in the present embodiment, only the arrangement configuration of the amplification optical fiber 20 in the third section SC3 is different from that of the first embodiment.

Specifically, in the first embodiment, the fiber portion 20A and the fiber portion 20B are parallel to each other in the third section SC3. On the other hand, in the present embodiment, the distance between the fiber portion 20A and the fiber portion 20B increases toward the ends thereof in the third section SC3.

In the same manner as in the first embodiment, each of the fiber portions 20A and 20B is arranged on the heat dissipation plate 10 so as to extend in a direction away from the second section SC2 in the third section SC3 of the present embodiment.

In this manner, in the optical amplification component 2 of the present embodiment, each of the fiber portions 20A and 20B extends in a direction away from the second section SC2 in the third section SC3. In addition, the distance between the fiber portion 20A and the fiber portion 20B increases toward the ends thereof in the third section SC3.

Therefore, the both ends of the amplification optical fiber 20 at which the amount of heat generation is largest are located away from the fiber portions 20A and 20B located on the inner side of the both ends of the amplification optical fiber 20. In addition, the both ends are also located away from each other.

Therefore, deterioration of the both ends of the amplification optical fiber 20 and the vicinities thereof, the deterioration being caused by heat generated at the both ends of the amplification optical fiber 20, can be significantly reduced.

In the present embodiment, the distance between the fiber portion 20A and the fiber portion 20B increases toward the ends thereof in the third section SC3. However, the distance between the fiber portion 20A and the fiber portion 20B may increase toward the ends thereof also in the second section SC2 in addition to the third section SC3.

(3) Third Embodiment

Next, the third embodiment will be described in detail with reference to the accompanying drawings. The same or equivalent components as/to those of the above embodiments are denoted by the same reference sings, and an overlapping description will be omitted excepting when a description for such components is particularly necessary.

Figure 5:
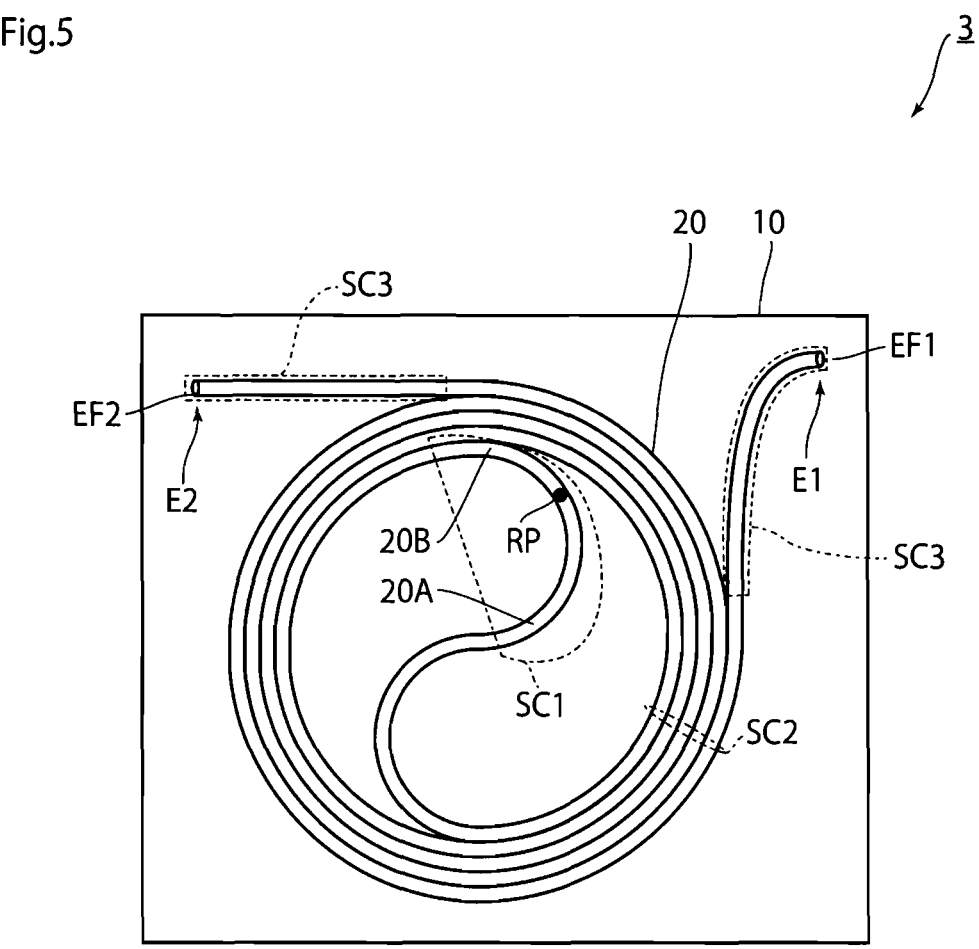
FIG. 5 is a diagram illustrating an optical amplification component in a third embodiment.

FIG. 5 is a diagram illustrating an optical amplification component 3 in the third embodiment. As illustrated in FIG. 5, in the optical amplification component 3 in the present embodiment, only the arrangement configuration of the amplification optical fiber 20 in the third section SC3 is different from that of the second embodiment.

Specifically, in the second embodiment, a direction in which the fiber portion 20A extends in the third section SC3 (hereinbelow, referred to as a first extending direction) and a direction in which the fiber portion 20B extends in the third section SC3 (hereinbelow, referred to as a second extending direction) are the same as each other.

On the other hand, the first extending direction and the second extending direction are opposite to each other in the present embodiment. The first extending direction heads for one end of the heat dissipation plate 10, and the second extending direction heads for the other end thereof.

In the present embodiment, the first extending direction and the second extending direction are substantially exactly opposite to each other. However, the first extending direction and the second extending direction may not be exactly opposite to each other as long as the angle formed by the fiber portion 20A in the first extending direction and the fiber portion 20B in the second extending direction is larger than 90°. For example, the first travelling direction may head for the short side of the heat dissipation plate 10 and the second extending direction may head for the long side thereof.

Further, the first extending direction and the second extending direction are different from each other from respective base parts at which the fiber portion 20A in the first extending direction and the fiber portion 20B in the second extending direction are separated from the second section SC2. However, the first extending direction and the second extending direction may be different from each other from respective midway parts between the base parts at which the fiber portions 20A and 20B are separated from the second section SC2 and the ends of the fiber portions 20A and 20B.

Further, the fiber portion 20A extends in a straight line in the third section SC3 after separating from the second section SC2. However, the fiber portion 20A may be warped in the third section SC3. In the same manner, although the fiber portion 20B is warped in the third section SC3 after separating from the second section SC2, the fiber portion 20B may extend in a straight line in the third section SC3.

Further, although the first end face EF1 of the fiber portion 20A in the third section SC3 and the second end face EF2 of the fiber portion 20B in the third section SC3 face in exactly opposite directions, the first end face EF1 and the second end face EF2 may not face in exactly opposite directions.

In the same manner as in the second embodiment, in the present embodiment, the fiber portion 20A and the fiber portion 20B are arranged on the heat dissipation plate 10 in such a manner that the distance between the fiber portion 20A and the fiber portion 20B increases toward the ends thereof in the third section SC3, and each of the fiber portions 20A and 20B extends in a direction away from the second section SC2 in the third section SC3.

As described above, in the optical amplification component 3 in the present embodiment, the first extending direction and the second extending direction are opposite to each other.

Therefore, in the optical amplification component 3 in the present embodiment, the distance between the both ends of the amplification optical fiber 20 at which the amount of heat generation is largest is longer than that in the optical amplification component 2 of the second embodiment in which the first extending direction and the second extending direction are the same as each other.

Therefore, according to the optical amplification component 3 in the present embodiment, deterioration of the both ends of the amplification optical fiber 20 and the vicinities thereof, the deterioration being caused by heat generated at the both ends of the amplification optical fiber 20, can be further significantly reduced.

In the present embodiment, the first end face EF1 of the fiber portion 20A and the second end face EF2 of the fiber portion 20B face in the opposite directions.

Therefore, local heat generation in the heat dissipation plate 10 can be reduced compared to the case where the first end face EF1 of the fiber portion 20A and the second end face EF2 of the fiber portion 20B face in the same direction.

(4) Fourth Embodiment

Next, the fourth embodiment will be described in detail with reference to the accompanying drawings. The same or equivalent components as/to those of the above embodiments are denoted by the same reference sings, and an overlapping description will be omitted excepting when a description for such components is particularly necessary.

Figure 6:
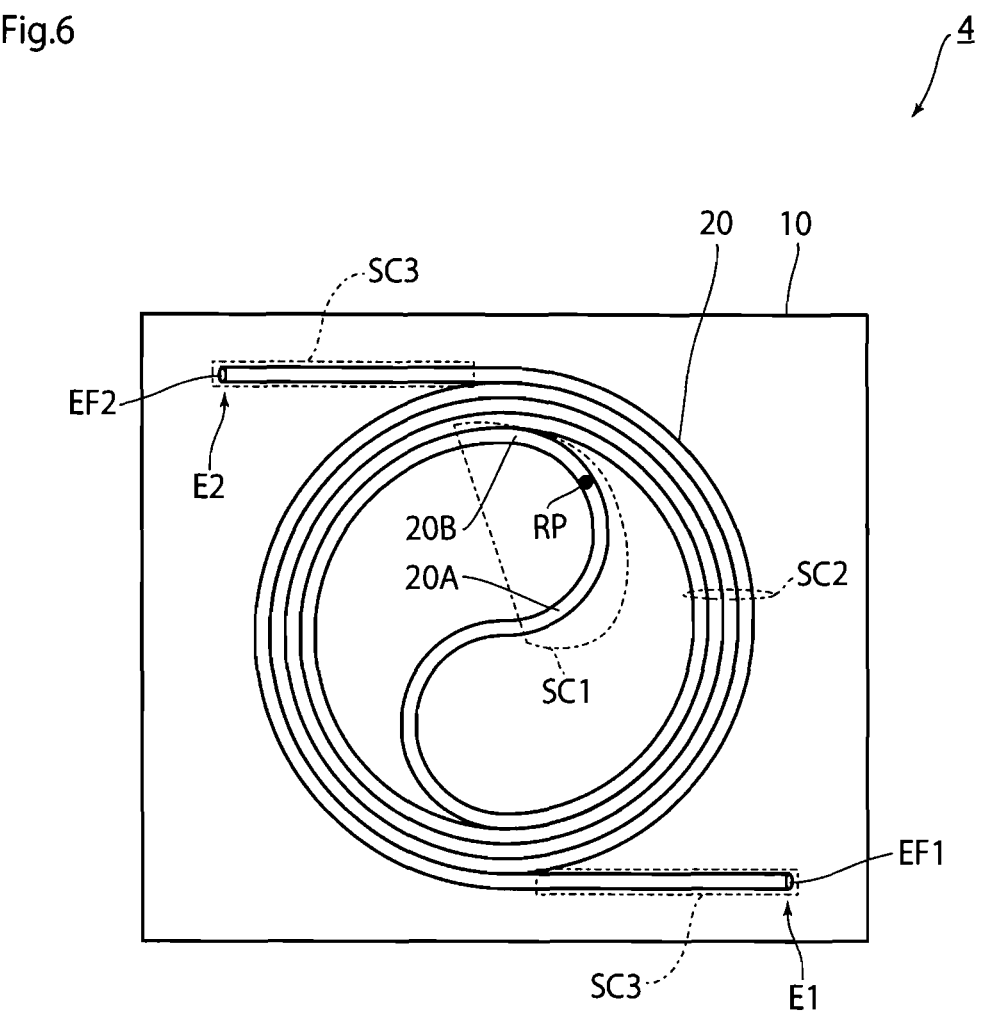
FIG. 6 is a diagram illustrating an optical amplification component in a fourth embodiment.

FIG. 6 is a diagram illustrating an optical amplification component 4 in the fourth embodiment. As illustrated in FIG. 6, in the optical amplification component 4 in the present embodiment, only the arrangement configuration of the amplification optical fiber 20 in the third section SC3 is different from that of the third embodiment.

Specifically, in the third embodiment, the base part at which the fiber portion 20A in the third section SC3 is separated from the second section SC2 and the base part at which the fiber portion 20B in the third section SC3 is separated from the second section SC2 are not opposed to each other across the first section SC1. In addition, the end E1 of the fiber portion 20A and the vicinity thereof in the third section SC3 (hereinbelow, referred to as a first end part) and the end E2 of the fiber portion 20B and the vicinity thereof in the third section SC3 (hereinbelow, referred to as a second end part) are also not opposed to each other across the first section SC1.

On the other hand, in the present embodiment, the base part of the fiber portion 20A in the third section SC3 and the base part of the fiber portion 20B in the third section SC3 are opposed to each other across the first section SC1. Further, the first end part of the fiber portion 20A and the second end part of the fiber portion 20B are also opposed to each other across the first section SC1.

In the present embodiment, the base part and the first end part of the fiber portion 20A and the base part and the second end part of the fiber portion 20B are exactly opposed to each other across the first section SC1. However, one or both of the positional relationship between the base parts and the positional relationship between the first end part and the second end part may not be an exact opposite relationship.

In the same manner as in the third embodiment, the first extending direction and the second extending direction in the present embodiment are opposite to each other. Further, the fiber portion 20A and the fiber portion 20B are arranged on the heat dissipation plate 10 in such a manner that the distance between the fiber portion 20A and the fiber portion 20B increases toward the ends thereof in the third section SC3, and each of the fiber portions 20A and 20B extends in a direction away from the second section SC2 in the third section SC3.

As described above, in the optical amplification component 4 in the present embodiment, the end part of the fiber portion 20A and the end part of the fiber portion 20B are opposed to each other across the first section SC1, and the first extending direction of the fiber portion 20A and the second extending direction of the fiber portion 20B are opposite to each other.

Therefore, in the optical amplification component 4 in the present embodiment, the both ends of the amplification optical fiber 20 at which the amount of heat generation is largest can be symmetrically arranged with respect to the first section SC1. As to the relationship with the heat dissipation plate 10, the both ends of the amplification optical fiber 20 at which the amount of heat generation is largest can be arranged substantially on a diagonal line of the heat dissipation plate 10 across the first section SC1.

Therefore, according to the optical amplification component 4 in the present embodiment, the distance between the both ends of the amplification optical fiber 20 at which the amount of heat generation is largest can be made longer than that in the optical amplification component 3 of the third embodiment. As a result, deterioration of the both ends of the amplification optical fiber 20 and the vicinities thereof due to heat can be further significantly reduced.

(5) Fifth Embodiment

Next, the fifth embodiment will be described in detail with reference to the accompanying drawings. The same or equivalent components as/to those of the above embodiments are denoted by the same reference sings, and an overlapping description will be omitted excepting when a description for such components is particularly necessary.

Figure 7:
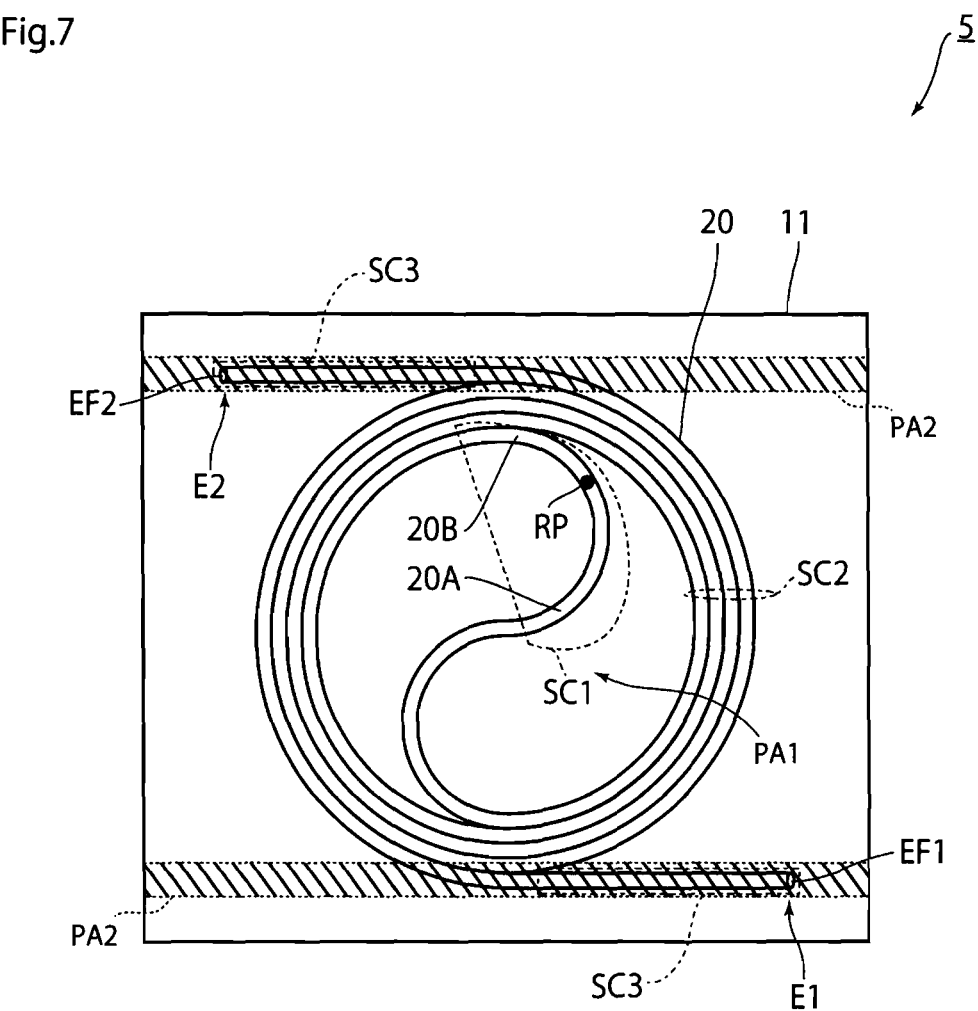
FIG. 7 is a diagram illustrating an optical amplification component in a fifth embodiment.

FIG. 7 is a diagram illustrating an optical amplification component 5 in the fifth embodiment. As illustrated in FIG. 7, in the optical amplification component 5 in the present embodiment, only the structure of a heat dissipation plate 11 is different from the structure of the heat dissipation plate 10 of the fourth embodiment.

Specifically, in the heat dissipation plate 10 of the fourth embodiment, the thermal resistance in a heat dissipation area in which the first section SC1 is arranged and the thermal resistance in a heat dissipation area in which the third section SC3 is arranged are the same as each other.

On the other hand, in the heat dissipation plate 11 of the present embodiment, the thermal resistance in a heat dissipation area PA2 in which the third section SC3 is arranged is smaller than the thermal resistance in a heat dissipation area PA1 in which the first section SC1 is arranged.

For example, the heat dissipation area PA1 is formed of aluminum, and the heat dissipation area PA2 is formed of copper which has a smaller thermal resistance than aluminum. As a result, it is possible to obtain the heat dissipation plate 11 in which the thermal resistance in the heat dissipation area PA2 is smaller than the thermal resistance in the heat dissipation area PA1.

As another example, the heat dissipation surface of the heat dissipation area PA1 is formed into a flat shape, and a groove that has a curvature substantially equal to the curvature of the outer peripheral surface of a fiber portion is formed on the heat dissipation surface of the heat dissipation area PA2 to thereby increase the contact area between the outer peripheral surface of the fiber portion and the heat dissipation surface. As a result, it is possible to obtain the heat dissipation plate 11 in which the thermal resistance in the heat dissipation area PA2 is smaller than the thermal resistance in the heat dissipation area PA1.

As another example, convex portions called fins are formed on a surface of the heat dissipation plate 11, the surface being opposite to the heat dissipation surface thereof, at positions corresponding to the heat dissipation area PA1 in which the first section SC1 is arranged and the heat dissipation area PA2 in which the third section SC3 is arranged. The length of a convex portion corresponding to the heat dissipation area PA2 is made longer than the length of a convex portion corresponding to the heat dissipation area PA1. As a result, it is possible to obtain the heat dissipation plate 11 in which the thermal resistance in the heat dissipation area PA2 is smaller than the thermal resistance in the heat dissipation area PA1.

As another example, a cooling mechanism of air-cooling type, water-cooling type, or electronic cooling type is provided only in the heat dissipation area PA2. As a result, it is possible to obtain the heat dissipation plate 11 in which the thermal resistance in the heat dissipation area PA2 is smaller than the thermal resistance in the heat dissipation area PA1.

As described above, in the heat dissipation plate 11 of the optical amplification component 5 in the present embodiment, the thermal resistance in the heat dissipation area PA2 is smaller than the thermal resistance in the heat dissipation area PA1. Therefore, it is possible to cool the both ends of the amplification optical fiber 20 at which the amount of heat generation is largest more intensively than the first section SC1 at which the amount of heat generation is smallest.

Therefore, according to the optical amplification component 5 in the present embodiment, it is possible to reduce deterioration of the amplification optical fiber 20 while more downsizing the structure of the heat dissipation plate 11 than the structure of the heat dissipation plate 10 of the fourth embodiment in which the thermal resistance of the heat dissipation area PA1 and the thermal resistance of the heat dissipation area PA2 are same as each other.

In the heat dissipation plate 11 of the present embodiment, the thermal resistance in the heat dissipation area PA2 in which the third section SC3 is arranged is smaller than the thermal resistance in the heat dissipation area PA1 in which the first section SC1 is arranged.

Figure 8:
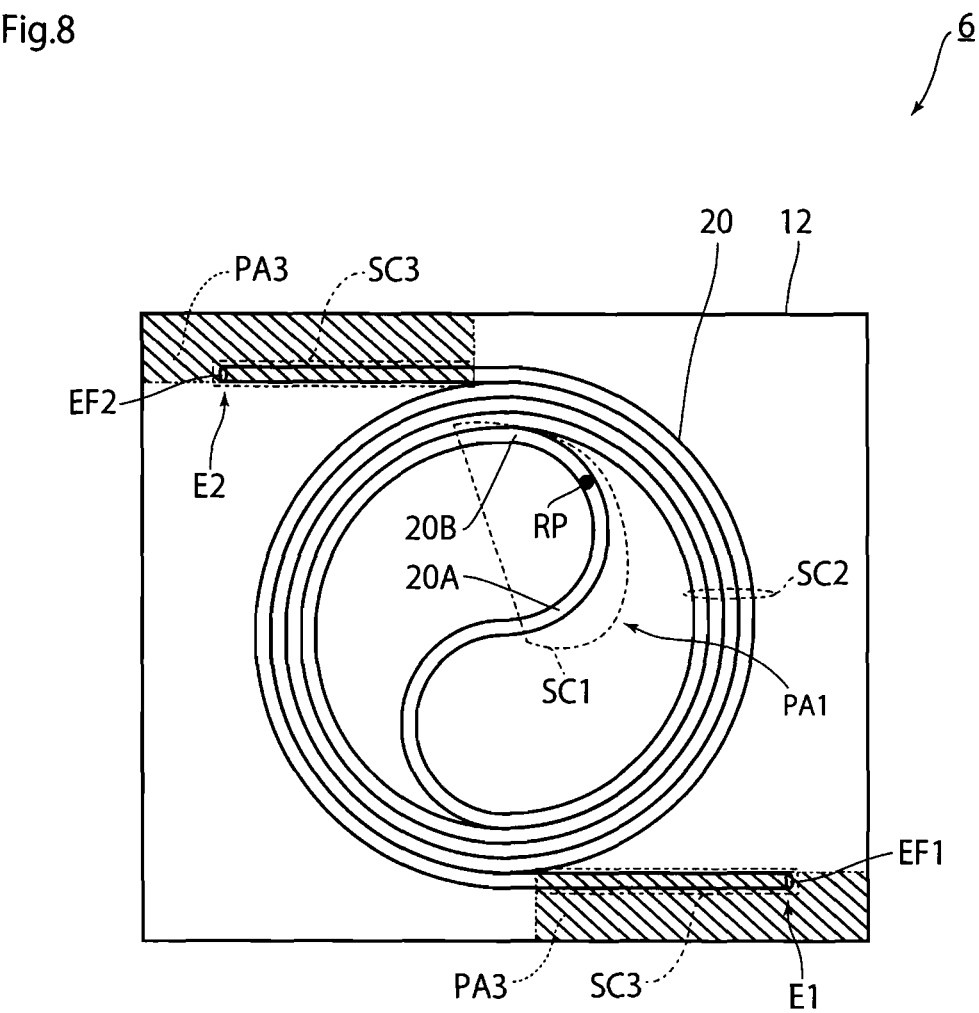
FIG. 8 is a diagram illustrating an example (1) of the structure of the heat dissipation plate.

However, as shown by an optical amplification component 6 of FIG. 8, a heat dissipation plate 12 may be used, for example. In the heat dissipation plate 12, the thermal resistance in a heat dissipation area PA3 in which the third section SC3 is arranged is smaller than the thermal resistance of a heat dissipation area in which the first section SC1 and the second section SC2 are arranged.

Figure 9:
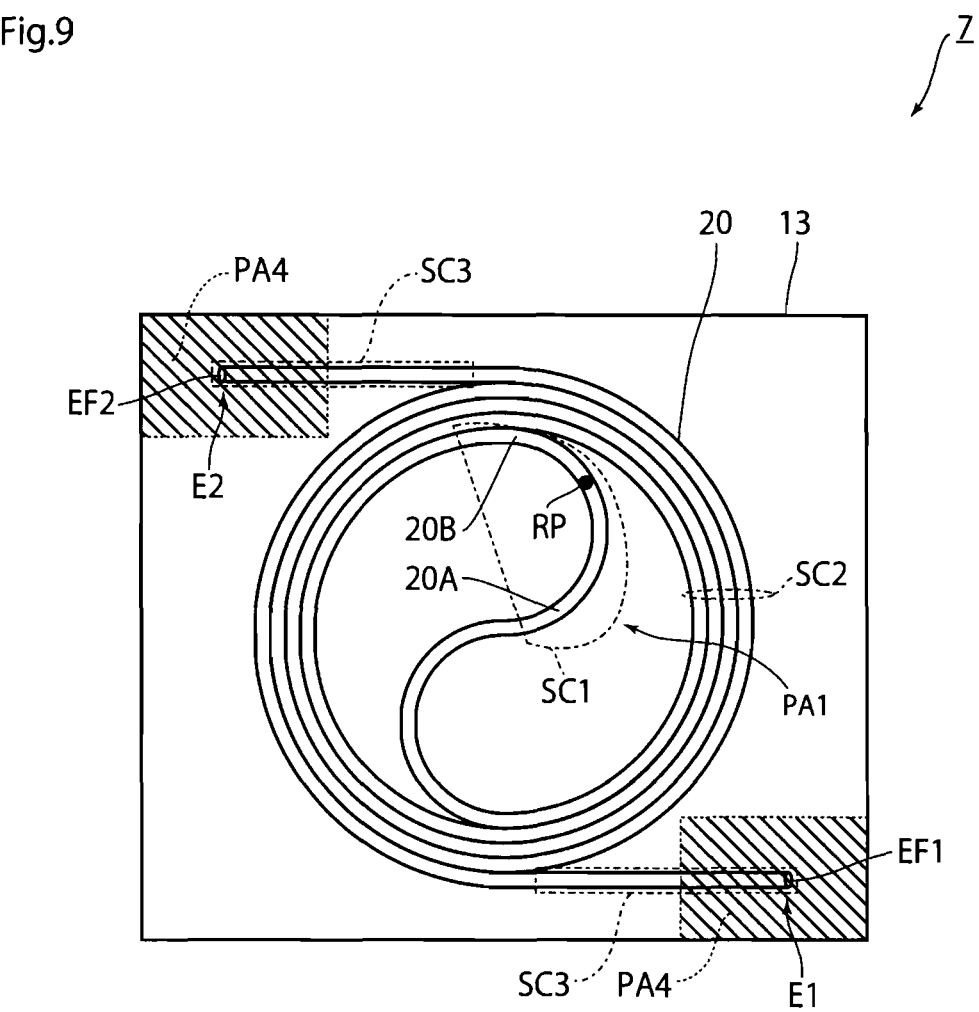
FIG. 9 is a diagram illustrating an example (2) of the structure of the heat dissipation plate.

Further, as shown by an optical amplification component 7 of FIG. 9, a heat dissipation plate 13 may be used, for example. In the heat dissipation plate 13, the thermal resistance in a heat dissipation area PA4 in which the end part of the third section SC3 is arranged is smaller than the thermal resistance of a heat dissipation area in which the first section SC1 and the second section SC2 are arranged.

Basically, it is only required for the heat dissipation plate to have a structure in which the thermal resistance in a heat dissipation area in which each of the end part of the fiber portion 20A and the end part of the fiber portion 20B is arranged is smaller than the thermal resistance in a heat dissipation area in which the first section SC1 is arranged. Any of the structures of the respective heat dissipation plates 11 to 13 can also be applied to the heat dissipation plate 10 of the first to fourth embodiments.

(6) Sixth Embodiment

Next, the sixth embodiment will be described in detail with reference to the accompanying drawings. The same or equivalent components as/to those of the above embodiments are denoted by the same reference sings, and an overlapping description will be omitted excepting when a description for such components is particularly necessary.

Figure 10:
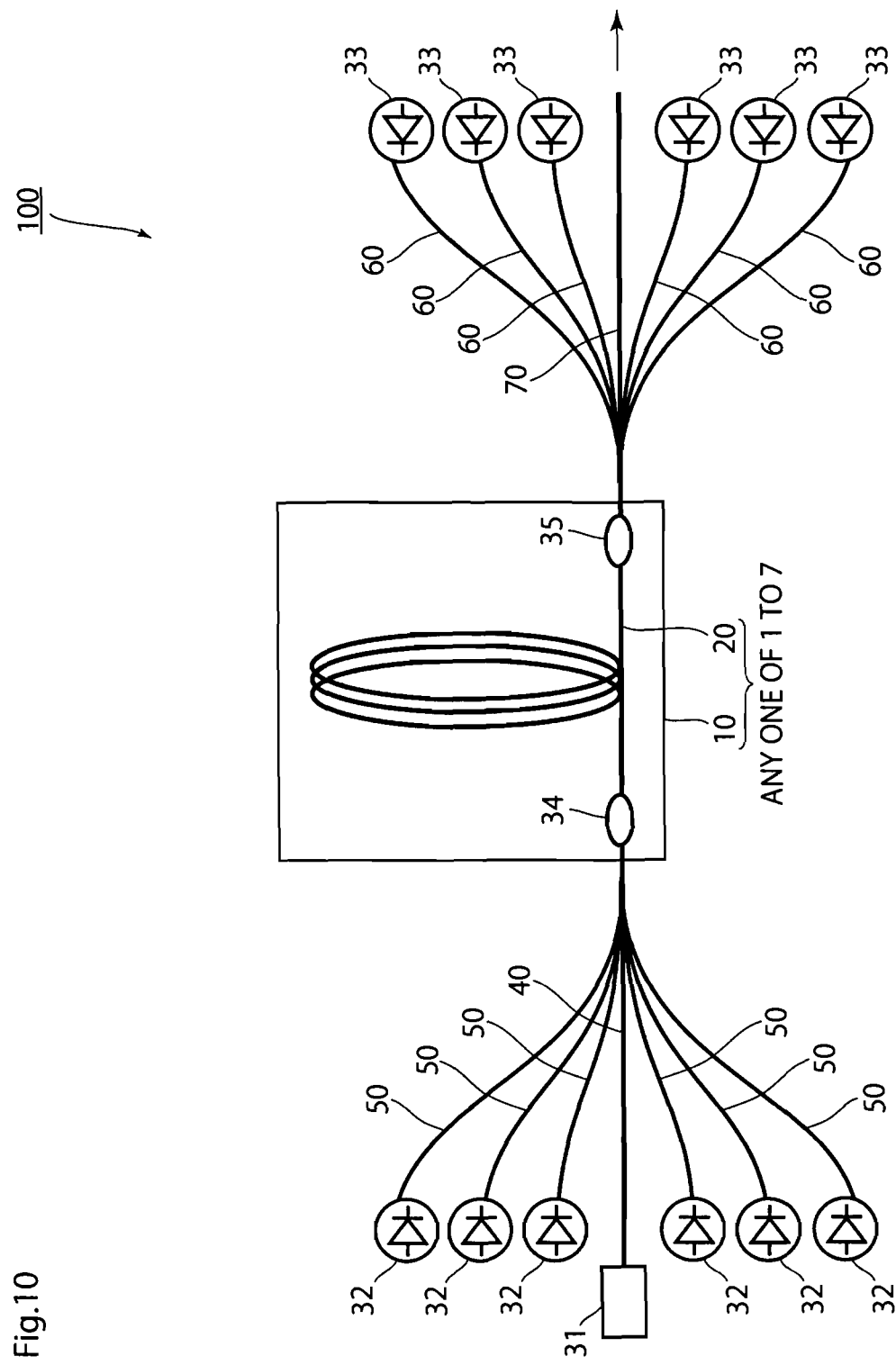
FIG. 10 is a diagram illustrating a fiber laser device in a sixth embodiment.

FIG. 10 is a diagram illustrating a fiber laser device in the sixth embodiment. As illustrated in FIG. 10, a fiber laser device 100 in the present embodiment is a master oscillator power amplifier (MO-PA) type fiber laser device.

The fiber laser device 100 includes, as main components, any one of the optical amplification components 1 to 7 in the first to fifth embodiments, a seed light source 31, a plurality of first pumping light sources 32, a plurality of second pumping light source 33, an input side optical coupler 34, and an output side optical coupler 35. The arrangement state of the amplification optical fiber 20 in FIG. 10 is illustrated for descriptive purpose, and is therefore different from the arrangement state illustrated in each of FIG. 1 and FIGS. 4 to 9.

The seed light source 31 emits seed light. The seed light source 31 is, for example, a laser light source that includes a laser diode, or a Fabry-Perot type or fiber ring type laser light source.

The first pumping light sources 32 and the second pumping light sources 33 emit pumping light, and are, for example, laser diodes.

The input side optical coupler 34 inputs seed light emitted from the seed light source 31 to the core 21 of the amplification optical fiber 20 at the first end E1 thereof, and also inputs pumping light emitted from the first pumping light sources 32 to the first cladding 22 of the amplification optical fiber 20 at the first end E1 thereof.

In the present embodiment, the seed light emitted from the seed light source 31 enters the input side optical coupler 34 through an input optical fiber 40. The input optical fiber 40 is, for example, a single mode fiber. One end of a core of the input optical fiber 40 is optically coupled to the seed light source 31, and the other end of the core of the input optical fiber 40 is optically coupled to the core 21 of the amplification optical fiber 20 through the input side optical coupler 34.

The pumping light emitted from the first pumping light sources 32 enters the input side optical coupler 34 through pumping light input fibers 50. The pumping light input fibers 50 are, for example, multimode fibers. The number of the pumping light input fibers 50 is the same as the number of the first pumping light sources 32. One end of a core of each of the pumping light input fibers 50 is optically coupled to each of the first pumping light sources 32, and the other end of the core of each of the pumping light input fibers 50 is optically coupled to the first cladding 22 of the amplification optical fiber 20 through the input side optical coupler 34.

The output side optical coupler 35 inputs pumping light emitted from the second pumping light sources 33 to the first cladding 22 of the amplification optical fiber 20 at the second end E2 thereof, and also outputs the seed light that propagates through the core 21 of the amplification optical fiber 20 to the outside from the second end E2.

In the present embodiment, the pumping light emitted from the second pumping light sources 33 enters the output side optical coupler 35 through pumping light input fibers 60. The pumping light input fibers 60 are, for example, multimode fibers. The number of the pumping light input fibers 60 is the same as the number of the second pumping light sources 33. One end of a core of each of the pumping light input fibers 60 is optically coupled to each of the second pumping light sources 33, and the other end of the core of each of the pumping light input fibers 60 is optically coupled to the first cladding 22 of the amplification optical fiber 20 through the output side optical coupler 35.

The output side optical coupler 35 outputs the seed light to an output optical fiber 70. The output optical fiber 70 is, for example, a single mode fiber. One end of a core of the output optical fiber 70 is optically coupled to the core 21 of the amplification optical fiber 20 through the output side optical coupler 35.

In the fiber laser device 100 of the present embodiment, when seed light is input to the core 21 of the amplification optical fiber 20 at the first end E1 thereof, the input seed light propagates through the core 21 from the first end E1 toward the second end E2 of the amplification optical fiber 20.

On the other hand, when pumping light is input to the first cladding 22 of the amplification optical fiber 20 at the first end E1 thereof, the input pumping light propagates through the first cladding 22 and the core 21 from the first end E1 toward the second end E2 of the amplification optical fiber 20.

Further, when pumping light is input to the first cladding 22 of the amplification optical fiber 20 at the second end E2 thereof, the input pumping light propagates through the first cladding 22 and the core 21 from the second end E2 toward the first end E1 of the amplification optical fiber 20.

The active element which is added to the core 21 is pumped by the pumping light that propagates through the first cladding 22 and the core 21. The active element in a pumped state induces stimulated emission by the seed light that propagates through the core 21. The seed light is amplified due to the stimulated emission. The amplified seed light is output to the output optical fiber 70 from the second end E2 of the amplification optical fiber 20 by the output side optical coupler 35.

Also when any one of the optical amplification components 1 to 7 in the first to fifth embodiments is used as one of the components of such a fiber laser device 100, deterioration of the fiber portions located on the inner side of the both ends of the amplification optical fiber 20, the deterioration being caused by heat generated at the both ends of the amplification optical fiber 20, can be significantly reduced. In this manner, the fiber laser device 100 capable of improving the life of the amplification optical fiber 20 is provided.

(7) Seventh Embodiment

Next, the seventh embodiment will be described in detail with reference to the accompanying drawings. The same or equivalent components as/to those of the above embodiments are denoted by the same reference sings, and an overlapping description will be omitted excepting when a description for such components is particularly necessary.

Figure 11:
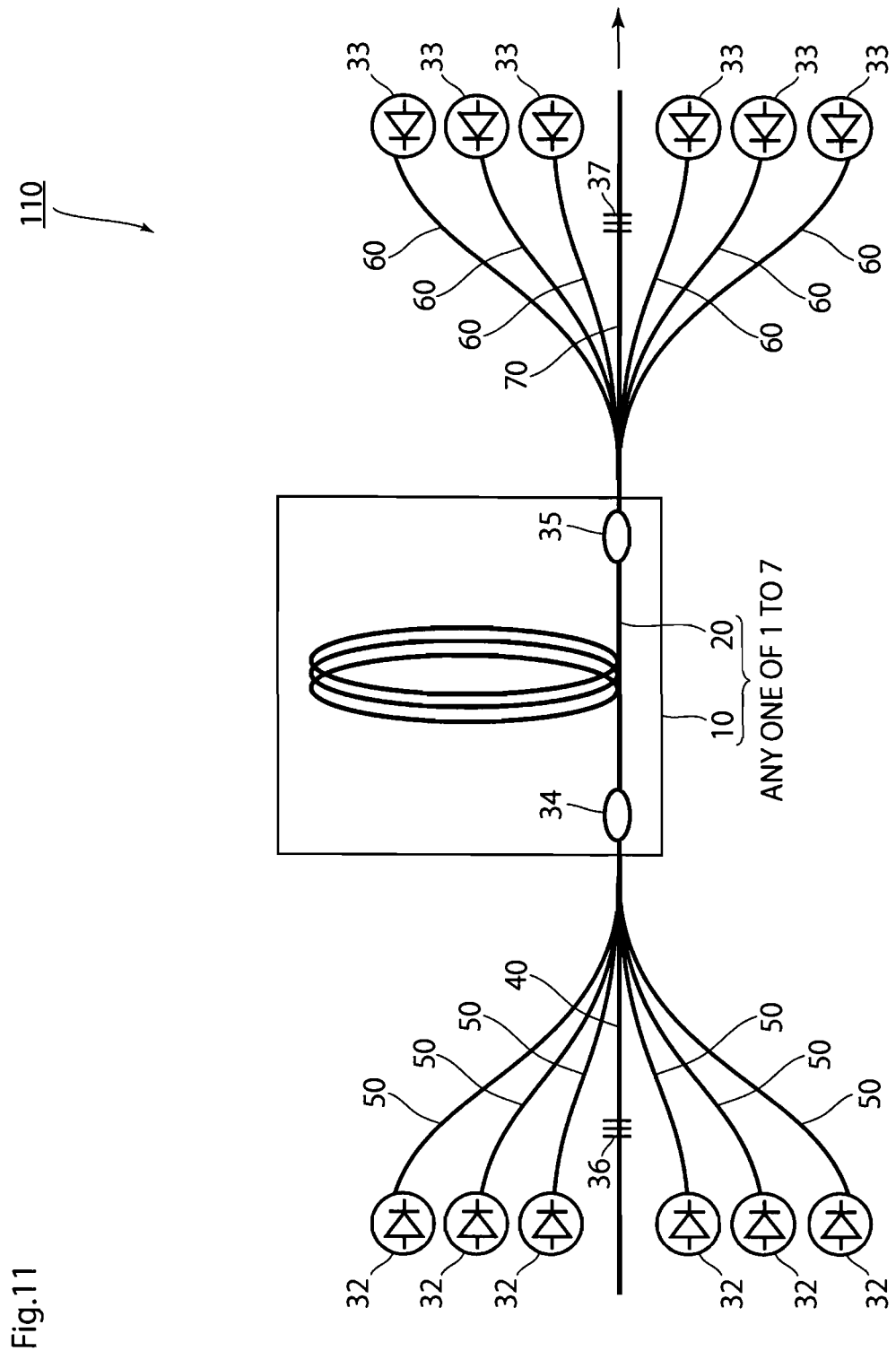
FIG. 11 is a diagram illustrating a fiber laser device in a seventh embodiment.

FIG. 11 is a diagram illustrating a fiber laser device in the seventh embodiment. As illustrated in FIG. 11, a fiber laser device 110 of the present embodiment is a resonance type fiber laser device. The arrangement state of the amplification optical fiber 20 in FIG. 11 is illustrated for descriptive purpose, and is therefore different from the arrangement state illustrated in each of FIG. 1 and FIGS. 4 to 9.

The fiber laser device 110 includes, as main components, any one of the optical amplification components 1 to 7 in the first to fifth embodiments, a plurality of first pumping light sources 32, a plurality of second pumping light source 33, an input side optical coupler 34, an output side optical coupler 35, a first fiber Bragg grating (FBG) 36 as a first mirror, and a second fiber Bragg grating (FBG) 37 as a second mirror.

The first FBG 36 is provided in an input optical fiber 40, and has a structure in which portions with a high refractive index are formed along the longitudinal direction of the amplification optical fiber 20 at regular intervals. The first FBG 36 is adjusted so as to reflect at least a part of light emitted from the active element of the amplification optical fiber 20 in a pumped state, the part of light having some wavelengths.

The second FBG 37 is provided in an output optical fiber 70, and has a structure in which portions with a high refractive index are formed along the longitudinal direction of the amplification optical fiber 20 at regular intervals. The second FBG 37 is adjusted so as to reflect light having the same wavelengths as the light reflected by the first FBG 36 with a lower reflectivity than the first FBG 36.

In the fiber laser device 110 of the present embodiment, pumping light that has entered the first cladding 22 of the amplification optical fiber 20 propagates through the first cladding 22 and the core 21 of the amplification optical fiber 20. The active element which is added to the core 21 is pumped by the pumping light, and light having a specific wavelength is thereby emitted from the active element.

The light emitted from the active element propagates through the core 21 of the amplification optical fiber 20. The light having a specific wavelength moves back and forth between the first FBG 36 and the second FBG 37, and is amplified. A part of the amplified light passes through the second FBG 37, and is emitted from the output end of the amplification optical fiber 20 to the output optical fiber 70.

Also when any one of the optical amplification components 1 to 7 in the first to fifth embodiments is used as one of the components of such a fiber laser device 110, deterioration of the fiber portions located on the inner side of the both ends of the amplification optical fiber 20, the deterioration being caused by heat generated at the both ends of the amplification optical fiber 20, can be significantly reduced. In this manner, the fiber laser device 110 capable of improving the life of the amplification optical fiber 20 is provided.

(8) Modifications

Although the first to seventh embodiments have been described above as examples, the present invention is not limited to the above embodiments.

For example, in the first to seventh embodiments, each of the fiber portion 20A and the fiber portion 20B extends in a direction away from the second section SC2 in the third section SC3. However, each of the fiber portion 20A and the fiber portion 20B may not necessarily extend in a direction away from the second section SC2 in the third section SC3 as long as each of the fiber portions 20A and 20B is located outside the second section SC2 with being separated from the second section SC2 in the entire third section SC3.

Further, the first end part or the second end part of the amplification optical fiber 20 may be positioned closer to the second section SC2 than the intermediate area of the third section SC3 as long as each of the fiber portions 20A and 20B is separated from the second section SC2 in the entire third section SC3. Further, the fiber portions 20A and the fiber portions 20B may be wound in a spiral in the third section SC3 in a similar manner as in the second section SC2 as long as at least the end of the fiber portion 20A and the end of the fiber portion 20B of the amplification optical fiber 20 are separated from the side surfaces of the fiber portions 20A and 20B wound in a spiral. Further, even when either one of the fiber portion 20A and the fiber portion 20B of the amplification optical fiber 20 is wound in a spiral up to the end thereof and a third section SC3 corresponding thereto therefore does not exist, it is only required that at least the end of the fiber portion 20A and the end of the fiber portion 20B of the amplification optical fiber 20 are separated from the side surfaces of the fiber portions 20A and 20B wound in a spiral. When there is no third section SC3, it is more preferred that the distance between the fiber portion 20A and the fiber portion 20B increases toward the ends thereof in the second section SC2.

In other words, it is only required that the amplification optical fiber 20 has the first section SC1 and the second section SC2 where the fiber portion 20A and the fiber portion 20B are wound in a spiral outside the first section SC1 along each other, and the circumference of the first end part and the circumference of the second end part of the amplification optical fiber 20 are separated from the side surface of the outermost spiral turn of the fiber portions 20A and 20B. In other words, the circumference of the first end part of the amplification optical fiber 20 extending from the outermost fiber portion wound in a spiral and the circumference of the second end part of the amplification optical fiber 20 extending from the second outermost fiber portion wound in a spiral are separated from the side surfaces of the third and following outermost fiber portions wound in a spiral.

In addition to the above embodiments and modifications, combination, omission, modification, and addition of a known technique can be appropriately performed with respect to the respective components of the optical amplification components 1 to 7, the fiber laser device 100 and the fiber laser device 110 without departing from the scope of the present invention.

The invention claimed is:

1. An optical amplification component comprising:
a heat dissipation plate; and
an amplification optical fiber arranged on the heat dissipation plate, the amplification optical fiber including
a first section extending from a reference position between a first end and a second end of the amplification optical fiber up to a position at which a first fiber portion extending from the reference position toward the first end and a second fiber portion extending from the reference position toward the second end are aligned in one direction, and
a second section where the first fiber portion and the second fiber portion are wound in a spiral outside the first section along each other,
wherein the circumference of a first end part of the amplification optical fiber and the circumference of a second end part of the amplification optical fiber are separated from side surfaces of the first fiber portion and the second fiber portion wound in a spiral, and
wherein the heat dissipation plate has a structure in which a thermal resistance in a first heat dissipation area in which each of the first end part and the second end part of the amplification optical fiber is arranged is smaller than the thermal resistance in a second heat dissipation area in which the first section is arranged such that the amount of heat dissipation in the first heat dissipation area is larger than the amount of heat dissipation in the second heat dissipation area.

2. The optical amplification component according to claim 1,
wherein the amplification optical fiber includes the first section, the second section, and a third section extending from a position at which each of the first fiber portion and the second fiber portion is separated from the second section up to each of the first end and the second end of the amplification optical fiber, and
wherein each of the first fiber portion and the second fiber portion is located outside the section with being separated from the second section in the entire third section.

3. The optical amplification component according to claim 2, wherein each of the first fiber portion and the second fiber portion extends in a direction away from the second section in the third section.

4. The optical amplification component according to claim 2, wherein an extending direction of the first fiber portion in the third section and an extending direction of the second fiber portion in the third section are opposite to each other.

5. The optical amplification component according to claim 2, wherein the distance between the first fiber portion and the second fiber portion increases toward the ends thereof in the second section, or the second section and the third section.

6. The optical amplification component according to claim 1, wherein the first end part and the second end part of the amplification optical fiber are opposed to each other across the first section.

7. The optical amplification component according to claim 1, wherein one end face and the other end face of the amplification optical fiber face in opposite directions.

8. A fiber laser device comprising:
the optical amplification component according to claim 1;
a seed light source;
a first pumping light source;
a second pumping light source;
an input side optical coupler inputting seed light emitted from the seed light source to a core of the amplification optical fiber at the first end of the amplification optical fiber and inputting pumping light emitted from the first pumping light source to a cladding of the amplification optical fiber at the first end of the amplification optical fiber; and
an output side optical coupler inputting pumping light emitted from the second pumping light source to the second end of the amplification optical fiber and outputting seed light propagating through the core of the amplification optical fiber to the outside.

9. A fiber laser device comprising:
the optical amplification component according to claim 1;
a first pumping light source;
a second pumping light source;
an input side optical coupler inputting pumping light emitted from the first pumping light source to a cladding of the amplification optical fiber at the first end of the amplification optical fiber;
an output side optical coupler inputting pumping light emitted from the second pumping light source to the second end of the amplification optical fiber;
a first mirror reflecting at least a part of light emitted from an active element added to a core of the amplification optical fiber; and
a second mirror reflecting light reflected by the first mirror with a lower reflectivity than the first mirror.

10. A fiber laser device comprising:
the optical amplification component according to claim 2;
a seed light source;
a first pumping light source;
a second pumping light source;
an input side optical coupler inputting seed light emitted from the seed light source to a core of the amplification optical fiber at the first end of the amplification optical fiber and inputting pumping light emitted from the first pumping light source to a cladding of the amplification optical fiber at the first end of the amplification optical fiber; and
an output side optical coupler inputting pumping light emitted from the second pumping light source to the second end of the amplification optical fiber and outputting seed light propagating through the core of the amplification optical fiber to the outside.

11. A fiber laser device comprising:
the optical amplification component according to claim 3;
a seed light source;
a first pumping light source;
a second pumping light source;

an input side optical coupler inputting seed light emitted from the seed light source to a core of the amplification optical fiber at the first end of the amplification optical fiber and inputting pumping light emitted from the first pumping light source to a cladding of the amplification optical fiber at the first end of the amplification optical fiber; and an output side optical coupler inputting pumping light emitted from the second pumping light source to the second end of the amplification optical fiber and outputting seed light propagating through the core of the amplification optical fiber to the outside.

12. A fiber laser device comprising:
the optical amplification component according to claim 4;
a seed light source;
a first pumping light source;
a second pumping light source;
an input side optical coupler inputting seed light emitted from the seed light source to a core of the amplification optical fiber at the first end of the amplification optical fiber and inputting pumping light emitted from the first pumping light source to a cladding of the amplification optical fiber at the first end of the amplification optical fiber; and
an output side optical coupler inputting pumping light emitted from the second pumping light source to the second end of the amplification optical fiber and outputting seed light propagating through the core of the amplification optical fiber to the outside.

13. A fiber laser device comprising:
the optical amplification component according to claim 5;
a seed light source;
a first pumping light source;
a second pumping light source;
an input side optical coupler inputting seed light emitted from the seed light source to a core of the amplification optical fiber at the first end of the amplification optical fiber and inputting pumping light emitted from the first pumping light source to a cladding of the amplification optical fiber at the first end of the amplification optical fiber; and
an output side optical coupler inputting pumping light emitted from the second pumping light source to the second end of the amplification optical fiber and outputting seed light propagating through the core of the amplification optical fiber to the outside.

14. A fiber laser device comprising:
the optical amplification component according to claim 6;
a seed light source;
a first pumping light source;
a second pumping light source;
an input side optical coupler inputting seed light emitted from the seed light source to a core of the amplification optical fiber at the first end of the amplification optical fiber and inputting pumping light emitted from the first pumping light source to a cladding of the amplification optical fiber at the first end of the amplification optical fiber; and
an output side optical coupler inputting pumping light emitted from the second pumping light source to the second end of the amplification optical fiber and outputting seed light propagating through the core of the amplification optical fiber to the outside.

15. A fiber laser device comprising:
the optical amplification component according to claim 7;
a seed light source;
a first pumping light source;
a second pumping light source;
an input side optical coupler inputting seed light emitted from the seed light source to a core of the amplification optical fiber at the first end of the amplification optical fiber and inputting pumping light emitted from the first pumping light source to a cladding of the amplification optical fiber at the first end of the amplification optical fiber; and
an output side optical coupler inputting pumping light emitted from the second pumping light source to the second end of the amplification optical fiber and outputting seed light propagating through the core of the amplification optical fiber to the outside.

16. A fiber laser device comprising:
the optical amplification component according to claim 2;
a first pumping light source;
a second pumping light source;
an input side optical coupler inputting pumping light emitted from the first pumping light source to a cladding of the amplification optical fiber at the first end of the amplification optical fiber;
an output side optical coupler inputting pumping light emitted from the second pumping light source to the second end of the amplification optical fiber;
a first mirror reflecting at least a part of light emitted from an active element added to a core of the amplification optical fiber; and
a second mirror reflecting light reflected by the first mirror with a lower reflectivity than the first mirror.

17. A fiber laser device comprising:
the optical amplification component according to claim 3;
a first pumping light source;
a second pumping light source;
an input side optical coupler inputting pumping light emitted from the first pumping light source to a cladding of the amplification optical fiber at the first end of the amplification optical fiber;
an output side optical coupler inputting pumping light emitted from the second pumping light source to the second end of the amplification optical fiber;
a first mirror reflecting at least a part of light emitted from an active element added to a core of the amplification optical fiber; and
a second mirror reflecting light reflected by the first mirror with a lower reflectivity than the first mirror.

18. A fiber laser device comprising:
the optical amplification component according to claim 4;
a first pumping light source;
a second pumping light source;
an input side optical coupler inputting pumping light emitted from the first pumping light source to a cladding of the amplification optical fiber at the first end of the amplification optical fiber;
an output side optical coupler inputting pumping light emitted from the second pumping light source to the second end of the amplification optical fiber;
a first mirror reflecting at least a part of light emitted from an active element added to a core of the amplification optical fiber; and
a second mirror reflecting light reflected by the first mirror with a lower reflectivity than the first mirror.

19. A fiber laser device comprising:
the optical amplification component according to claim 5;
a first pumping light source;
a second pumping light source;

an input side optical coupler inputting pumping light emitted from the first pumping light source to a cladding of the amplification optical fiber at the first end of the amplification optical fiber;

an output side optical coupler inputting pumping light emitted from the second pumping light source to the second end of the amplification optical fiber;

a first mirror reflecting at least a part of light emitted from an active element added to a core of the amplification optical fiber; and a second mirror reflecting light reflected by the first mirror with a lower reflectivity than the first mirror.

20. A fiber laser device comprising:

the optical amplification component according to claim 6;

a first pumping light source;

a second pumping light source;

an input side optical coupler inputting pumping light emitted from the first pumping light source to a cladding of the amplification optical fiber at the first end of the amplification optical fiber;

an output side optical coupler inputting pumping light emitted from the second pumping light source to the second end of the amplification optical fiber;

a first mirror reflecting at least a part of light emitted from an active element added to a core of the amplification optical fiber; and a second mirror reflecting light reflected by the first mirror with a lower reflectivity than the first mirror.

21. A fiber laser device comprising:

the optical amplification component according to claim 7;

a first pumping light source;

a second pumping light source;

an input side optical coupler inputting pumping light emitted from the first pumping light source to a cladding of the amplification optical fiber at the first end of the amplification optical fiber;

an output side optical coupler inputting pumping light emitted from the second pumping light source to the second end of the amplification optical fiber;

a first mirror reflecting at least a part of light emitted from an active element added to a core of the amplification optical fiber; and a second mirror reflecting light reflected by the first mirror with a lower reflectivity than the first mirror.

* * * * *